United States Patent [19]

Park

[11] Patent Number: 5,302,027
[45] Date of Patent: Apr. 12, 1994

[54] REFRACTORY SIGHT TUBE FOR OPTICAL TEMPERATURE MEASURING DEVICE

[75] Inventor: Han K. Park, Allegheny County, Pa.

[73] Assignee: Vesuvius Crucible Company, Pittsburgh, Pa.

[21] Appl. No.: 964,763

[22] Filed: Oct. 22, 1992

[51] Int. Cl.$^5$ ............................................. G01K 1/08
[52] U.S. Cl. ................................... 374/139; 428/34.4; 374/208
[58] Field of Search ............... 374/130, 131, 139, 140, 374/208, 209; 501/94, 99, 100; 428/34.4; 138/140

[56] References Cited

U.S. PATENT DOCUMENTS

| | | | |
|---|---|---|---|
| 4,306,030 | 12/1981 | Watanabe et al. | 501/99 |
| 4,448,661 | 5/1984 | Rogger | 374/131 X |
| 4,540,675 | 9/1985 | Morris | 501/99 |
| 4,560,286 | 12/1985 | Wickersheim | 374/131 |
| 4,592,664 | 6/1986 | Bijlenga et al. | 374/131 |
| 4,598,996 | 7/1986 | Taiuchi | 374/131 X |
| 4,721,533 | 1/1988 | Phillippi et al. | 374/208 X |
| 4,737,038 | 4/1988 | Dostoomian | 374/139 |
| 4,796,671 | 1/1989 | Furushima et al. | 138/140 |
| 4,870,037 | 9/1989 | Hoggard et al. | 501/100 X |
| 4,871,698 | 10/1989 | Fishler | 501/100 X |
| 4,966,201 | 10/1990 | Svec et al. | 428/34.4 X |
| 5,071,258 | 12/1991 | Usher et al. | |
| 5,180,228 | 1/1993 | Turumi et al. | 374/139 |
| 5,185,300 | 2/1993 | Hoggard et al. | 501/99 |

*Primary Examiner*—William A. Cuchlinski, Jr.
*Assistant Examiner*—G. Bradley Bennett
*Attorney, Agent, or Firm*—Webb, Burden, Ziesenheim & Webb

[57] ABSTRACT

A sight tube for an optical temperature measuring device suitable for immersion in molten steel comprises an elongated, cylindrical body having an optical sighting bore therein extending axially from an open end of the body to a closed end. The body is a carbon bonded alumina graphite material made from a mix consisting of, in weight percent, between about 5-45% graphite; between about 20-85% alumina; 0 to 15% anti-oxidant; and between about 3-20% phenolic resin binder. The mixture is isostatically pressed in the desired body shape and fired at a temperature in excess of 1400° C. in a reducing atmosphere. The graphite is preferably a high purity flake graphite, greater than 99% pure. The alumina is preferably "brown" fused alumina grain having minimum amounts of volatile elements: sodium (Na), potassium (K), boron (B), phosphorous (P), sulphur (S) and chlorine (Cl). The sodium content, present as $Na_2O$ in the alumina source is less than 0.05% by weight, and preferably no more than 0.02% by weight.

6 Claims, 2 Drawing Sheets

REFRACTORY SIGHT TUBE FOR OPTICAL TEMPERATURE MEASURING DEVICE

BACKGROUND OF THE INVENTION

The invention relates generally to optical temperature measuring devices for monitoring the temperature of molten metals. More particularly, the invention relates to a refractory sight tube for use with an optical temperature sensing device adapted for continuous immersion in molten steel, for example.

Heretofore, it has been common to employ disposable lance thermocouple devices to measure steel temperature. The disposable lance thermocouples have been found to be inaccurate and do not allow for continuous measurement of the molten metal. In addition, the use of such disposable lance thermocouples involves some safety hazards to the operating personnel.

More recently, a continuous temperature measuring thermocouple has been developed for use in molten steel, as disclosed in commonly owned U.S. Pat. No. 4,721,533 "Protective Structure For An Immersion Pyrometer" to Phillippi et al. and U.S. Pat. No. 5,071,258 "Thermocouple Assembly" to Usher et al. The structures disclosed in these patents include an inner thermocouple assembly housed in a molybdenum sheath and an outer protective casing of a refractory metal oxide and graphite material for immersion in molten slag and steel.

While the continuous sensing thermocouple devices of the cited patents perform well, they require periodic replacement of the expensive noble metal inner thermocouple elements which gradually degrade over time at high temperature. Of course, the outer refractory casing must also be replaced at even more frequent intervals due to the severe corrosive and erosive effects of molten slag and steel.

Needless to say, there has been a need in the metallurgical field for a continuous temperature measuring device which accurately and economically determines the temperature of liquid steel. Infrared radiation detecting optical pyrometers have been known in the art for many years. These devices are optically sighted on a hot object, such as the surface of a metal bath, and the infrared radiation emitted from the bath is converted to an electrical signal calibrated to a given temperature read out. The accuracy of the conventional optical sighting pyrometer device is affected by furnace gases and variations in the slag/metal surface which gives rise to inaccurate readings. In addition, conventional optical pyrometers cannot sight beneath the slag layer to determine the steel temperature which is usually different than the temperature at the surface of the slag layer.

In U.S. Pat. No. 4,737,038 to Dostoomian, there is disclosed a device employing an optical pyrometer and a hollow dipstick of a ceramic material for immersion in molten metal to determine the temperature of the melt at a desired depth. The composition of the ceramic dipstick is not disclosed in the subject patent and is apparently not deemed to be critical, except for its ability to maintain its integrity at temperatures on the order of 1200° C.-1500° C. The ceramic dipstick of this patent also requires a preheating treatment in an induction heating apparatus prior to immersion to prevent cracking of the dipstick due to thermal shock. A protective quartz window is mounted in the dipstick along with a convex lens to establish a focal point coincident with the bottom surface of the dipstick for transmitting the infrared radiation emitted at the end of the dipstick to an infrared detector means. The detector means is either mounted on the end of the dipstick or disposed at a remote location and optically connected to the dipstick by fiber optic means.

To the best of my knowledge, this prior attempt to combine an optical pyrometer with a ceramic dipstick or sight tube has not found any significant commercial success, possibly due to shortcomings in the ceramic dipstick portion of the device. Refractory elements which are continuously immersed in slag and steel must be capable of withstanding the corrosive and erosive effects of the molten media. Ideally, these elements should also be resistant to thermal shock so as to reduce or eliminate the need for costly and time consuming preheat devices and procedures. In the case of temperature measuring devices, the refractory immersion tube should also possess some degree of enhanced thermal conductivity to prevent a time lag in monitoring accurate melt temperatures. Ceramic materials heretofore commonly used in the art to protect temperature measuring devices for immersion in molten metal such as fused silica, alumina and clays do not possess relatively high thermal conductivity for these purposes.

Other refractory compositions such as alumina-graphite possess enhanced thermal conductivity and thermal shock resistance but have been found to contain certain impurities which volatilize at molten steel temperatures. Such volatile constituents in the refractory material contaminate the optical system of the temperature sensing device which adversely affects the accuracy of the system.

The present invention solves the problems of the prior art by providing a refractory sight tube for an optical temperature measuring device for continuous immersion in molten steel or other molten media. The sight tube of the invention is made from a refractory composition which provides an environment for the optical pyrometer which is substantially free of harmful vapor phase contaminants so as to improve the temperature measuring accuracy of the device.

Still further, the present invention provides a refractory sight tube which has enhanced thermal conductivity so as to improve the thermal responsiveness of the temperature sensing device while also improving the thermal shock resistance of the tube and eliminating the necessity to preheat the refractory prior to use.

SUMMARY OF THE INVENTION

Briefly, the present invention is directed to an immersion sight tube for an optical temperature measuring device comprising an elongated, cylindrical body having an optical sighting bore formed therein extending axially from an open end of the body to a closed end thereof. The body is preferably a carbon bonded alumina graphite material made from a mix consisting of, in weight percent, between about 5-45% graphite; between about 20-85% alumina; 0 to 15% anti-oxidant; and between about 3-20% phenolic resin binder. The mixture is isostatically pressed in the desired body shape and fired at a temperature in excess of 1400° C. in a reducing atmosphere. The graphite is preferably a high purity flake graphite, greater than 99% pure. The alumina "brown" fused alumina grain having none or minimum amounts of volatile elements: sodium (Na), potassium (K), boron (B), phosphorous (P), sulphur (S) and chlorine (Cl). Preferably, the sodium content, if present as $Na_2O$ in the alumina source should be less than 0.05% by weight, and, more preferably, no more than 0.02% by weight.

DETAILED DESCRIPTION OF THE INVENTION

Figure 1:
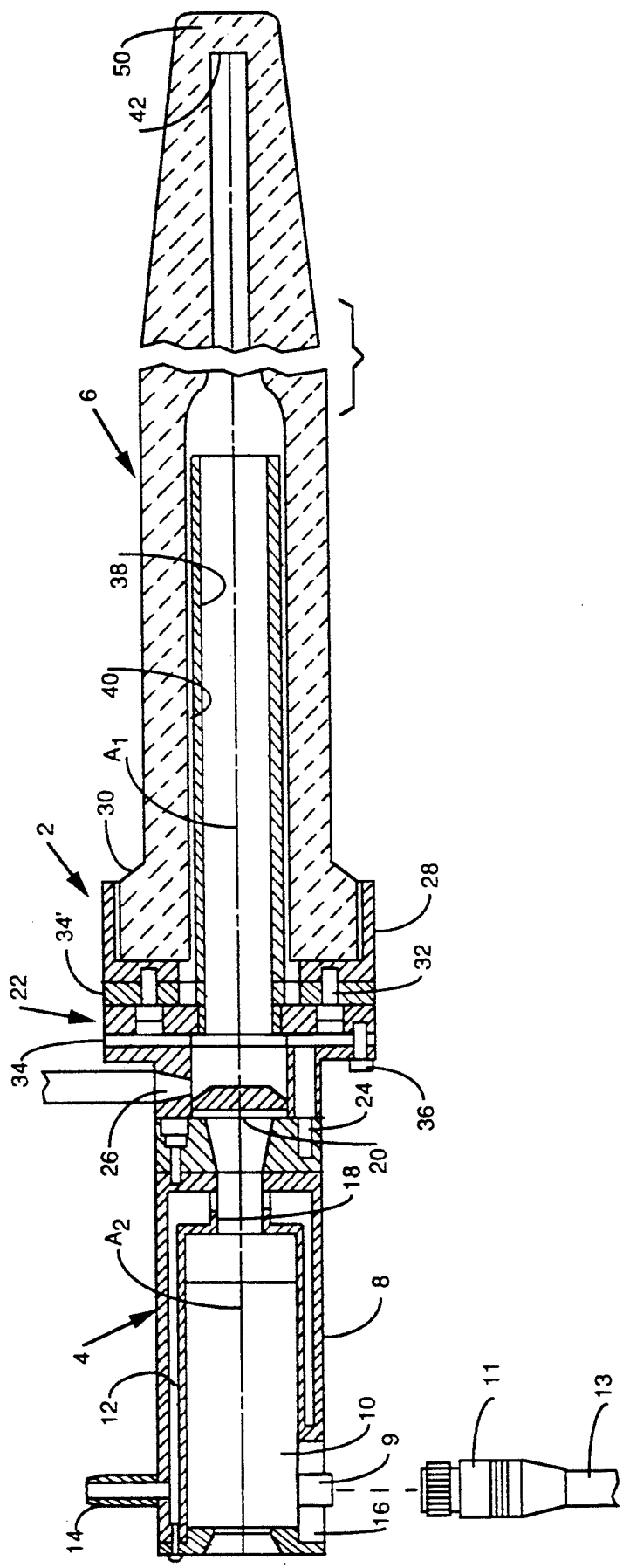
FIG. 1 is cross-sectional side view of an optical temperature measuring device having a refractory sight tube according to the present invention.

Referring now to FIG. 1 of the drawings, an optical temperature measuring device made according to the present invention is identified generally by reference numeral 2. The temperature measuring device 2 includes an optical radiation pyrometer 4 and a refractory sighting tube 6 of the invention attached thereto. The pyrometer 4 consists of a cylindrical housing 8 containing an infrared radiation sensing unit 10, surrounded by a chamber 12 for circulating cooling air introduced by a conduit 14. The cooling air exits chamber 12 at exit port 16. A connector jack 11 is electrically connected to the sensing unit 10 at plug connector 9 to transmit electrical signals by way of cable 13 to a remote location for conversion into temperature units. The housing includes an internal sight channel 18 capped by a protective quartz filter 20 which permits passage of infrared radiation therethrough but thermally insulates the sensing unit 10 from convective heat.

A mounting collar 22 joins the pyrometer 4 with the sight tube 6. A plurality of set screws 24 joins one end of the mounting collar to the pyrometer 4. A gas passage 26 is provided therein to permit the flow of cooling gas to pass over the hot side of the quartz filter. A metal mounting cap 28 is secured to a top, open end 30 of the sight tube 6 by way of a refractory cement, for example. Set screws 32 are employed to secure the mounting collar 22 and attached pyrometer 4 to the mounting cap 28 of the sight tube 6. Packing gaskets 34 and 34' are also preferably used in the mounting collar 22 to accommodate thermal expansion differentials between the metal and ceramic elements while achieving a tight fit. An adjustment screw 36 is located on the mounting collar 22 to insure coincident axial alignment between the longitudinal axes $A_1$ and $A_2$ of the sight tube 6 and the radiation sensing unit 10, respectively.

The mounting collar 22 allows for the selective removal of a worn or otherwise spent sight tube 6 from the optical pyrometer 4 and replacement with a new sight tube 6 at the end of a tundish casting campaign, for example.

An alignment tube 38, preferably of steel, is attached at one end to the mounting collar 22 and extends coaxially within an upper bore portion 40 of the sight tube 6. Tube 38 also provides additional structural strength to the assembly so as to resist bending moments which may be applied to the sight tube 6.

The sight tube 6 of the invention is made from a carbon bonded refractory material, preferably carbon bonded alumina-graphite material having extremely low amounts of volatile constituents resulting from the use of selected raw materials and special high temperature firing, as will be explained in greater detail hereinafter. The sight tube 6 comprises a generally cylindrical refractory body having an axial bore 40 extending from the open, upper end 30 of the body to a closed, lower end 50. As seen in FIG. 1, the longitudinal axis $A_1$ of the bore 40 is aligned with the sighting axis $A_2$ of the infrared radiation sensing unit 10 to permit direct sighting of floor 42 of the bore 40 at the closed, lower end 50. In use, the lower end 50 of the sight tube is immersed in a molten medium, such as steel. Heat is conducted through the refractory wall of the sight tube at the lower end 50 to the floor 42. The flake graphite constituent in the refractory material greatly enhances the thermal conductivity of the refractory and increases the thermal responsiveness of the device. Thus, lag time between the sighted temperature at the floor 42 and the actual melt temperature surrounding the lower end 50 is decreased through the use of flake graphite. By way of example, a common ceramic such as alumina or fused silica has a coefficient of thermal conductivity on the order of about 3–8 watt/mK while the alumina-graphite material of the invention is about 20 watt/mK.

Even though alumina-graphite offers superior thermal conductivity, thermal shock resistance and erosion resistance to steel and slag, it is necessary to modify the commonly used commercial alumina graphite material for use as a sight tube. Experimental pressed and fired sight tubes were made using commercial grade "brown" alumina grain plus commercial grade graphite with a primarily glass forming anti-oxidant. "Brown" fused alumina grain of the following typical analysis was used: 96.0% alumina, 2.5% Ti, 0.80% $SiO_2$ 0.10% $Fe_2O_3$, 0.02% $Na_2O$, 0.20% $ZrO_2$ and 0.30% ($MgO+CaO$). Commercial grade graphite, 85–90% pure, having a 10–15% ash content was also used. It was found that in the first one half hour of use in a continuous casting steel operation, the tundish temperature readings reported in Table I were quite variable using a sight tube made from the above materials.

TABLE I

| Time (min) | Spot Control | Continuous | Diff. | Variation |
|---|---|---|---|---|
| 0 | 1515° C. | 1491° C. | −24° | — |
| 10 | 1535° C. | 1505° C. | −30° | +14° |
| 20 | 1535° C. | 1520° C. | −15° | −9° |
| 30 | 1545° C. | 1524° C. | −21° | −3° |
| 40 | 1541° C. | 1520° C. | −21° | −3° |

In the test results reported in Table I, the "spot control" temperature was obtained using a disposable immersion thermocouple, while the "continuous" readings were made using the device depicted in FIG. 1. Ideally, the difference between the spot control temperature and the continuous reading optical pyrometer should be as constant as possible. In this manner, a constant calibration factor can then be applied to the optical pyrometer readings to obtain the desired, actual metal temperature. In order to accomplish the desired goal of constant reading variation, entries in the last column of the Table under the heading "Variation" should be as consistently low as possible.

The variation in temperature readings obtained by the optical pyrometer reported in Table I was theorized to result from gaseous vapor phase impurities present in the bore 40 of the sight tube 6. These vaporous impurities deposit on the surface of the quartz filter 20 which affect the transmission of radiant energy therethrough. The contamination thus caused greater than desired variability in the initial temperature readings obtained by the sensing unit 10. This deposit of impurities on the quartz filter 20 occurred even though the outer surface of the filter was continuously flushed with a stream of cooling gas from the passage 26.

In an effort to improve the performance of the sight tube reported in Table I, a further refractory mix was made and tested. This new mix employed a commercial grade "brown" fused alumina refractory grain and a high purity flake graphite.

It will be noted that "brown" alumina grain contains a relatively high level of $TiO_2$ as a contaminant; but, on the other hand, "brown" alumina surprisingly contains a much lower level of $Na_2O$ than a commercial higher purity "white" alumina grain, i.e., 0.02% vs. 0.35%. It is believed that the higher level of $TiO_2$ is not deleterious to the optical properties of the sight tube because $TiO_2$ is not a volatile constituent at steel making temperatures. $Na_2O$, however, is volatile at steel making temperatures and is believed to play a significant role in causing variable temperature readings in an optical pyrometric sensing system. Therefore, $Na_2O$ is limited to no more than 0.05% and preferably no more than 0.02% in the alumina source. In addition, compounds of other volatile elements such as potassium, boron, phosphorous, sulphur and chlorine are eliminated or held to minimum trace amounts of less than 0.05% each in the raw material mix. It is also theorized that the glass forming anti-oxidant material may contribute to the presence of volatile constituents within the sighting bore at steel-making temperatures. It is therefore believed to be beneficial to eliminate the glass forming anti-oxidant from the mixture. However, non-glass forming anti-oxidants that will not be volatized at steelmaking temperatures can be used, such as carbides, nitrides or metallic elements.

In addition to the "brown" alumina, the preferred refractory mix formulation for the sight tube of the invention includes high purity, i.e., greater than 99% pure, flake graphite. Such high purity flake graphite is produced either by acid leaching or by mechanical processing and is commercially available from such suppliers as the Asbury Graphite Mills, Inc. or Superior Graphite Co.

A sight tube was formulated from a mixture of "brown" alumina and 99% pure, flake graphite and tested in a molten bath contained in a steel casting tundish in the same manner as previously described. The mixture contained no glass forming anti-oxidant. The results reported in Table II indicate that the sight tube of this test run possessed improved properties by yielding much less variation in the temperature readings during start-up over that reported in Table I. It is thus believed that the limitation of volatile elements such as Na, K, B, P, S and Cl from the refractory mix of the sight tube is significant in obtaining consistent optical readings.

TABLE II

| Time (min) | Spot Control | Continuous | Diff. | Variation |
|---|---|---|---|---|
| 0 | 1540° C. | 1508° C. | −32° C. | — |
| 10 | 1535° C. | 1504° C. | −31° C. | −1° |
| 20 | 1545° C. | 1515° C. | −30° C. | −2° |
| 30 | 1545° C. | 1513° C. | −32° C. | 0 |
| 40 | 1543° C. | 1513° C. | −30° C. | −2° |

In practicing the invention, a preferred mix formulation for the sight tube 6 is as follows, in weight percent:

| graphite | 5–45% |
|---|---|
| alumina | 20–85% |
| anti-oxidant | 0–15% |
| phenolic resin | 3–20% |

A more preferred mix formulation contains the following, in weight percent:

| graphite | 25–30% |
|---|---|
| alumina | 45–55% |
| anti-oxidant | 0–10% |
| phenolic resin | 10–14% |

As previously discussed, the alumina source is preferably "brown" alumina grain or an alumina source which has none or minimal amounts (less than 0.05 wt. %) of volatile elements. The anti-oxidant constituent, if used, is a non-volatile, non-glass forming carbide, nitride or metallic anti-oxidant. The grain, powder and binder is mixed in a conventional manner and isopressed to form a desired shape of sight tube 6. The pressed, green shape is then fired in a reducing atmosphere to develop the desired carbon bonded structure. In conventional practice, a carbon bonded alumina graphite shape is fired at about 1000° C. In the practice of the present invention, it is preferred to utilize a significantly higher temperature firing practice, namely, temperatures above 1400° C. This high firing eliminates gaseous phases from the phenolic resin carbon bond precursor, such as hydrogen. In addition, firing at a temperature above 1400° C. removes the reaction products of oxides reduced by the carbon.

Figure 2:
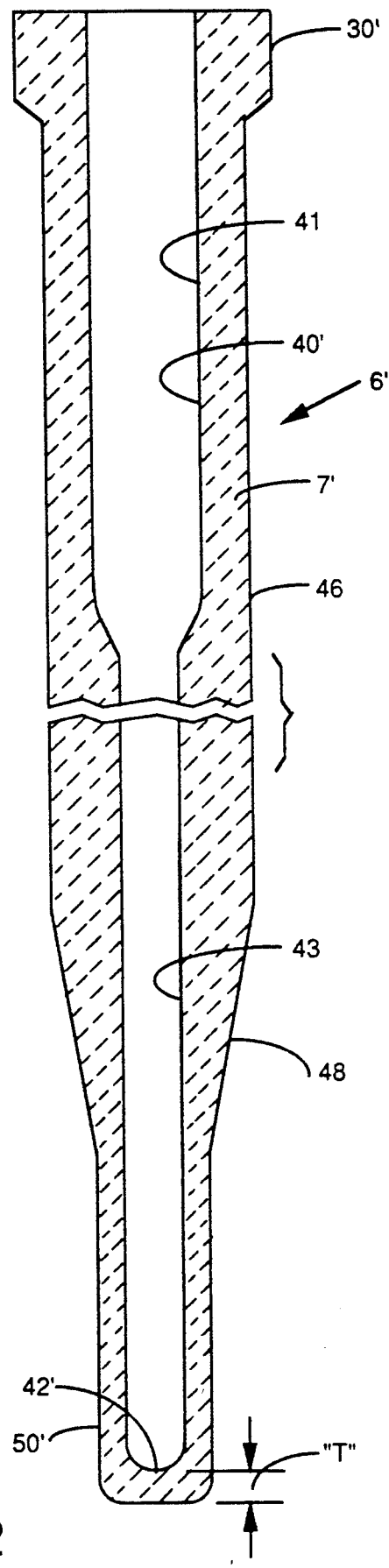
FIG. 2 is a cross-sectional side view of a presently preferred configuration of the refractory sight tube of the invention.

A presently preferred sight tube geometry is depicted in FIG. 2, represented generally by reference numeral 6'. The sight tube consists of a body 7' made from a pressed and high temperature fired, carbon bonded alumina graphite refractory material of a composition set forth above. The axial bore 40' is divided into an upper portion 41 having a greater diameter than the diameter of the lower bore portion 43. The outer diameter of the body also varies from top open end 30 to a reduced diameter central region 46. The diameter of the body gradually decreases further through a tapered region 48 to the lowermost end or nose portion 50'. The central region 46 of the sight tube 6' extending from the top of the lower bore 43 to the tapered region 48 contains a thicker sidewall, on the order of slightly less than one inch thick (24 mm) over a length of about one foot (300 mm). This thicker wall, central region 46, is adapted to be in contact with the slag layer and thus affords greater protection against corrosive and erosive attack. In the presently preferred embodiment of the sight tube 6', depicted in FIG. 2, the wall thickness "T" of the refractory body in the nose portion 50' surrounding the floor 42' of the bore is minimized so as to increase the thermal responsiveness of the device. Naturally, a thinner wall "T" requires less time to conductively traverse than would a wall of greater thickness. By way of example, a sight tube 6' having a length of about 30 inches (762 mm), and a dimension "T" of about 0.315" (8 mm) is suitable for use in a tundish for the continuous casting of steel.

In addition to use in a tundish, the sight tube and optical pyrometer of the invention may be used in other metallurgical vessels such as in electric arc furnaces, ladles and the like. The bath temperatures in an electric arc furnace are generally higher than in a tundish and may be on the order of 1650° C. up to 1700° C. The refractory composition of the present invention is capable of withstanding such high operating temperatures.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A sight tube for use with an optical temperature measuring device suitable for immersion in liquid steel and like molten media, comprising a refractory body having an axial sighting bore therein, formed from a carbon bonded alumina graphite refractory material wherein the alumina graphite refractory is pressed and fired from a mix consisting essentially of in % by weight:

| | |
|---|---|
| graphite | 5-45%; |
| alumina | 25-85%; |
| anti-oxidant | 0 to 15%; |
| phenolic resin binder | 3-20%; | wherein the alumina contains none or less than 0.05% by weight each of volatile elements, including sodium, potassium, boron, phosphorous, sulphur and chlorine.

2. The sight tube of claim 1 wherein the pressed alumina graphite mix is fired at a temperature above 1400° C. in a reducing atmosphere.

3. The sight tube of claim 1 wherein the alumina in the mix is "brown" alumina.

4. A sight tube for use with an optical temperature measuring device suitable for immersion in liquid steel and like molten media, comprising a refractory body having an axial sighting bore therein, formed from a carbon bonded alumina graphite refractory material wherein the alumina graphite refractory is pressed and fired from a mix consisting essentially of in % by weight:

| | |
|---|---|
| graphite | 25-30%; |
| alumina | 45-55%; |
| anti-oxidant | 0-10%; |
| phenolic resin binder | 10-14%; | and wherein the alumina is "brown" alumina containing none or minimal amounts of less than 0.05% by weight each of volatile elements, including sodium, potassium, boron, phosphorous, sulphur and chlorine.

5. The sight tube of claim 4 wherein the pressed alumina graphite mix is fired at a temperature in excess of 1400° C. in a reducing atmosphere.

6. A sight tube for an optical temperature measuring device suitable for immersion in liquid steel and like molten media comprising a refractory body having an axial sighting bore therein, formed of a pressed and fired carbon bonded alumina graphite refractory material from a mix consisting essentially of in % by weight:

| | |
|---|---|
| flake graphite of greater than 99% purity | 25-30%; |
| "brown" alumina | 45-55%; |
| anti-oxidant | 0-10%; |
| phenolic resin binder | 10-14%; | wherein the "brown" alumina contains none or minimal amounts of less than 0.05% by weight each of volatile elements, including sodium, potassium, boron, phosphorous, sulphur and chlorine, and wherein the pressed mixture is fired at a temperature in excess of 1400° C. in a reducing atmosphere.

* * * * *

UNITED STATES PATENT AND TRADEMARK OFFICE
CERTIFICATE OF CORRECTION

PATENT NO. : 5,302,027
DATED : April 12, 1994
INVENTOR(S) : Han K. Park

It is certified that error appears in the above-indentified patent and that said Letters Patent is hereby corrected as shown below:

Column 2 Lines 64-65 after "alumina" insert --is preferably--.

Column 4 Line 29 after $SiO_2$" insert --,--.

Signed and Sealed this

Second Day of August, 1994

Attest:

BRUCE LEHMAN

Attesting Officer    Commissioner of Patents and Trademarks